US012252115B2

(12) United States Patent
Zhou et al.

(10) Patent No.: US 12,252,115 B2
(45) Date of Patent: Mar. 18, 2025

(54) METHOD AND APPARATUS FOR VEHICLE ANTI-COLLISION CONTROL, COMPUTER DEVICE, STORAGE MEDIUM, AND VEHICLE

(71) Applicant: NIO TECHNOLOGY (ANHUI) CO., LTD, Hefei (CN)

(72) Inventors: Zelei Zhou, Hefei (CN); Yang Xu, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 296 days.

(21) Appl. No.: 17/727,985

(22) Filed: Apr. 25, 2022

(65) Prior Publication Data

US 2022/0340129 A1    Oct. 27, 2022

(30) Foreign Application Priority Data

Apr. 26, 2021    (CN) .......................... 202110453358.X

(51) Int. Cl.
*B60W 30/09* (2012.01)
*B60W 50/14* (2020.01)

(52) U.S. Cl.
CPC ............ *B60W 30/09* (2013.01); *B60W 50/14* (2013.01); *B60W 2540/12* (2013.01);
(Continued)

(58) Field of Classification Search
CPC ................. B60W 30/09; B60W 50/14; B60W 2540/804; B60W 2556/45; B60W 2554/802; B60W 2710/1005; B60W 2710/186; B60W 30/18054; B60W 30/18118; B60W 2556/65; B60W 30/0956; B60W 2050/143; B60W 2554/404; B60W 2554/80
(Continued)

(56) References Cited

U.S. PATENT DOCUMENTS 9,953,534 B1     4/2018  Malla
2019/0315343 A1*  10/2019  Steffey ................. G05D 1/0257
(Continued)

OTHER PUBLICATIONS

Extended Search Report for European Patent Application No. 22165333.0, dated Oct. 4, 2022, 10 pages.

*Primary Examiner* — Yi-Kai Wang
(74) *Attorney, Agent, or Firm* — Sheridan Ross P.C.

(57) ABSTRACT

The disclosure provides a method and an apparatus for vehicle anti-collision control, a computer device, a computer-readable storage medium, and a vehicle, which are applied to the technical field of automobiles. The method includes: receiving information about a rear vehicle status and a relative distance between a vehicle behind and a present vehicle; when the information about the status indicates that there is a vehicle coming from behind and the relative distance between the vehicle behind and the present vehicle is less than a pre-determined distance, calculating an estimated time T for which the present vehicle is to be rear-ended by the vehicle behind; and performing an anti-collision operation for the present vehicle if $T<T_{threshold}$, where $T_{threshold}$ is a pre-determined first anti-collision time threshold.

13 Claims, 2 Drawing Sheets

(52) U.S. Cl.
CPC ............... *B60W 2554/4045* (2020.02); *B60W 2554/802* (2020.02); *B60W 2554/804* (2020.02); *B60W 2556/45* (2020.02); *B60W 2710/1005* (2013.01); *B60W 2710/186* (2013.01)

(58) Field of Classification Search
USPC .......................................................... 701/41
See application file for complete search history.

(56) References Cited

U.S. PATENT DOCUMENTS

2019/0391582 A1   12/2019  Jung
2021/0061265 A1*  3/2021  Furtado ............... B60R 21/0132

\* cited by examiner

METHOD AND APPARATUS FOR VEHICLE ANTI-COLLISION CONTROL, COMPUTER DEVICE, STORAGE MEDIUM, AND VEHICLE

CROSS-REFERENCE TO RELATED APPLICATION

This application claims the benefit of China Patent Application No. 202110453358.X filed Apr. 26, 2021, the entire contents of which are incorporated herein by reference in its entirety.

TECHNICAL FIELD

The disclosure relates to the technical field of automobiles, and in particular, to a method and an apparatus for vehicle anti-collision control, a computer device, a computer-readable storage medium, and a vehicle.

BACKGROUND ART

Vehicle rear-end accidents are common traffic accidents, which may damage vehicles, affect traffic conditions on the roads, and at worse, endanger the health of people in the vehicles ahead and behind or even cause severe injuries and deaths.

As driver assistance technologies continuously develop, some functions of warning rear-end collisions between vehicles have emerged at present. These functions allow a vehicle to send a warning reminder to a driver of the present vehicle when the present vehicle detects a risk of being rear-ended by a vehicle behind. However, during actual use, the existing warning functions may encounter the problem as follows: when a risk of a rear-end collision is discovered through a warning function, it has been too late for warning, and under this circumstance, if a warning reminder is still sent to a driver, the driver may already not have enough time to deal with it or may even make mistakes when taking measures due to excessive panic.

Therefore, there is a need for a vehicle control technology that can better handle a risk of a rear-end collision.

SUMMARY OF THE INVENTION

In order to solve or at least alleviate one or more of the above problems, the following technical solutions are provided.

According to an aspect of the disclosure, a method for vehicle anti-collision control is provided. The method includes: receiving information about a rear vehicle status and a relative distance between a vehicle behind and a present vehicle; when the information about the status indicates that there is a vehicle coming from behind and the relative distance between the vehicle behind and the present vehicle is less than a pre-determined distance, calculating an estimated time T for which the present vehicle is to be rear-ended by the vehicle behind; and performing an anti-collision operation for the present vehicle if $T<T_{threshold}$, where $T_{threshold}$ is a pre-determined first anti-collision time threshold.

Optionally, the anti-collision operation is determined based on a status of a brake of the present vehicle and a forward safe distance d: when the brake is not stepped on and d>0, moving the present vehicle forward by a distance d', otherwise sending a first rear-end collision warning to a driver, where the forward safe distance d is a distance within which the present vehicle is able to move forward safely, and $d' \leq d$.

Optionally, the method for vehicle anti-collision control further includes: if it is detected that the vehicle behind sends information that the vehicle behind is to perform lane changing, skipping performing the anti-collision operation.

Optionally, the estimated time T is calculated at least based on the relative distance between the vehicle behind and the present vehicle, and a relative vehicle speed between the vehicle behind and the present vehicle and/or a relative acceleration between the vehicle behind and the present vehicle.

Optionally, the information about the rear vehicle status, the information that the vehicle behind is to perform lane changing, the relative distance between the vehicle behind and the present vehicle, and the relative vehicle speed between the vehicle behind and the present vehicle and/or the relative acceleration between the vehicle behind and the present vehicle are integrated information from a rear-view sensor of the present vehicle and/or information from a cloud server.

Optionally, the forward safe distance $d = d_1 - d_2$, $d_1$ is an actually measured distance between the present vehicle and the forward obstacle, $d_2$ is a pre-determined minimum distance between the present vehicle and the forward obstacle, and di and $d_2$ include integrated information from a front-view sensor of the present vehicle and/or information from a cloud server.

Optionally, when the brake is not stepped on and d>0, the first rear-end collision warning is also sent to the driver.

Optionally, the method for vehicle anti-collision control further includes: sending a second rear-end collision warning to the driver if $T_{threshold} \leq T < T'_{threshold}$, where $T'_{threshold}$ is a pre-determined second anti-collision time threshold, and $T'_{threshold} > T_{threshold}$.

Optionally, before the present vehicle is moved forward, the following operations are performed for the present vehicle: setting an auto-hold function to a deactivated state, setting a gear to a forward gear, and/or setting an auto-parking brake to a released state.

Optionally, after the present vehicle is moved forward, the auto-hold function is activated, and the present vehicle is braked through the auto-hold function.

According to another aspect of the disclosure, a computer device is provided. The computer device includes a processor and a memory. When a computer program stored on the memory is run on the processor, any of the above methods for vehicle anti-collision control is implemented.

According to still another aspect of the disclosure, a computer-readable storage medium is provided. The computer-readable storage medium has a computer program stored thereon. When the computer program is run on a processor, any of the above methods for vehicle anti-collision control is implemented.

According to yet another aspect of the disclosure, an apparatus for vehicle anti-collision control is provided. The apparatus includes: a receiving device configured to receive information about a rear vehicle status and a relative distance between a vehicle behind and a present vehicle; a calculation device configured to: when the information about the status indicates that there is a vehicle coming from behind and the relative distance between the vehicle behind and the present vehicle is less than a pre-determined distance, calculate an estimated time T for which the present vehicle is to be rear-ended by the vehicle behind; and a determination device configured to output an anti-collision control signal if $T<T_{threshold}$, where $T_{threshold}$ is a pre-determined first anti-collision time threshold.

Optionally, the determination device is further configured to determine the anti-collision control signal based on a status of a brake of the present vehicle and a forward safe distance d: when the brake is not stepped on and d>0, the anti-collision control signal enabling the present vehicle to move forward by a distance d', otherwise the anti-collision control signal enabling the present vehicle to send a first rear-end collision warning to a driver, where the forward safe distance d is a distance within which the present vehicle is able to move forward safely, and d'≤d.

Optionally, the receiving device is further configured to receive information about a lane change status of the vehicle behind; and the determination device is further configured to skip performing the anti-collision operation if the information about the lane change status indicates that the vehicle behind is to perform lane changing.

Optionally, the receiving device is further configured to receive a relative vehicle speed between the vehicle behind and the present vehicle and/or a relative acceleration between the vehicle behind and the present vehicle, and the calculation device is further configured to calculate the estimated time T at least based on the relative distance between the vehicle behind and the present vehicle, and the relative vehicle speed between the vehicle behind and the present vehicle and/or the relative acceleration between the vehicle behind and the present vehicle.

Optionally, the information about the rear vehicle status, the information that the vehicle behind is to perform lane changing, the relative distance between the vehicle behind and the present vehicle, and the relative vehicle speed between the vehicle behind and the present vehicle and/or the relative acceleration between the vehicle behind and the present vehicle are integrated information from a rear-view sensor of the present vehicle and/or information from a cloud server.

Optionally, the receiving device is further configured to receive an actually measured distance $d_1$ between the present vehicle and the forward obstacle and a pre-determined minimum distance $d_2$ between the present vehicle and the forward obstacle, where the forward safe distance $d=d_1-d_2$, and $d_1$ and $d_2$ include integrated information from a front-view sensor of the present vehicle and/or information from a cloud server.

Optionally, when the brake is not stepped on and d>0, the anti-collision control signal enables the first rear-end collision warning also to be sent to the driver.

Optionally, the determination apparatus is further configured to send a signal to enable the present vehicle to send a second rear-end collision warning to the driver if $T_{threshold} \leq T < T'_{threshold}$.

Optionally, before the present vehicle is moved forward, the anti-collision control signal enables the following operations to be performed for the present vehicle: setting an auto-hold function to a deactivated state, setting a gear to a forward gear, and/or setting an auto-parking brake to a released state.

Optionally, after the present vehicle is moved forward, the anti-collision control signal enables the following operations to be performed for the present vehicle: activating the auto-hold function, and braking the present vehicle through the auto-hold function.

According to still yet another aspect of the disclosure, a vehicle is provided, the vehicle including any of the above apparatuses for vehicle anti-collision control.

BRIEF DESCRIPTION OF THE DRAWINGS

The above and other objectives and advantages of the disclosure will be clearer and more thorough from the following detailed description in conjunction with the drawings.

DETAILED DESCRIPTION OF EMBODIMENTS

The term "vehicle", "car", or other similar terms used herein includes general motor vehicles, such as passenger vehicles (including sport utility vehicles, buses, trucks, etc.), various commercial vehicles, ships, aircrafts, etc., and includes hybrid vehicles, electric vehicles, plug-in hybrid electric vehicles, etc. A hybrid vehicle is a vehicle with two or more power sources, such as a vehicle powered by a gasoline engine and an electric motor. In addition, the terms such as "first", "second", "third", etc. herein are used to distinguish similar objects, and do not necessarily describe a specific sequence or order. In addition, the terms "comprise/include", "have", and similar expressions are intended to indicate non-exclusive inclusions, unless otherwise specifically stated.

Various exemplary embodiments according to the disclosure will be described below in detail with reference to the drawings.

Figure 1:
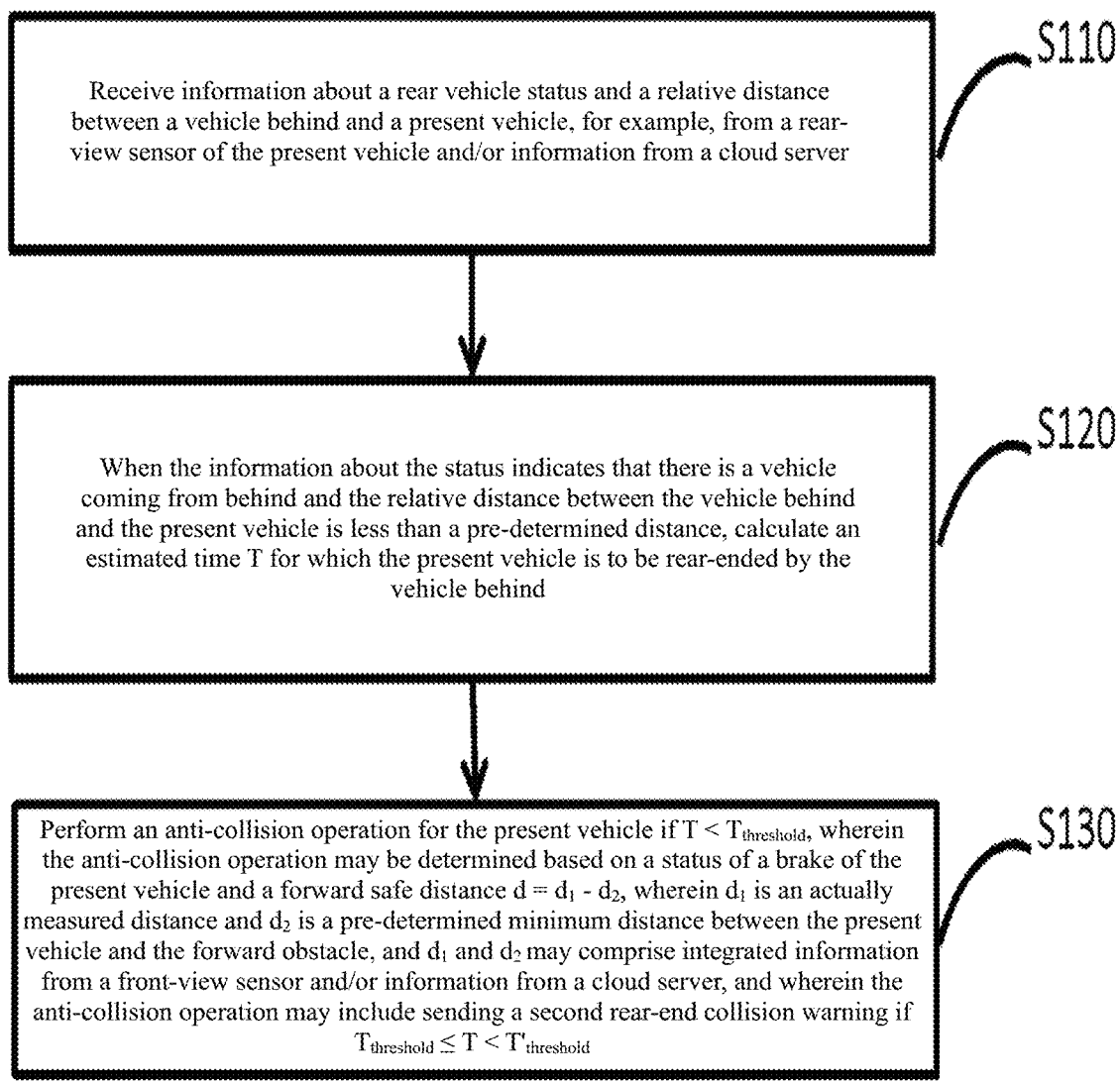
FIG. 1 is a flowchart of a method 1000 for vehicle anti-collision control according to an embodiment of the disclosure.

FIG. 1 is a flowchart of a method 1000 for vehicle anti-collision control according to an embodiment of the disclosure. As shown in FIG. 1, in step S110, information about a rear vehicle status and a relative distance between a vehicle behind and a present vehicle are received. In step S120, when the received information about the status indicates that there is a vehicle coming from behind and the relative distance between the vehicle behind and the present vehicle is less than a pre-determined distance, an estimated time T for which the present vehicle is to be rear-ended by the vehicle behind is calculated. The estimated time T may be calculated based on information associated with the present vehicle and the vehicle behind, for example, a relative vehicle speed between the vehicle behind and the present vehicle, a relative acceleration between the vehicle behind and the present vehicle, the relative distance between the vehicle behind and the present vehicle, etc. It can be understood that the received information mentioned herein may be information from a vehicle-mounted sensor (for example, a rear-view sensor, a front-view sensor, etc.), may be integrated information based on these vehicle-mounted sensors, may be information from a cloud server, or may be any combination of any of the above information. It can be further understood that the vehicle-mounted sensor mentioned herein may be a camera, a laser radar, a millimeter wave radar, or any suitable sensor mounted onto a vehicle.

In step S130, the estimated time T is compared with an anti-collision time threshold $T_{threshold}$, and an anti-collision operation is performed for the present vehicle if $T<T_{threshold}$. Here, the anti-collision time threshold $T_{threshold}$ is pre-determined. $T_{threshold}$ may be pre-determined based on an average reaction time for a driver to deal with a risk of being rear-ended, such as 1.0 s, 1.2 s, 1.4 s, or any suitable time. Where the estimated time for a rear-end collision is less than the threshold, if only a warning is sent, the driver may not have enough time to calmly deal with such an immediate risk of being rear-ended, and therefore, an appropriate automatic anti-collision operation for the vehicle is needed.

Optionally, a specific anti-collision operation is determined based on a status of a brake of the vehicle and a forward safe distance d: when the brake of the present vehicle is not stepped on and the forward safe distance d>0, moving the present vehicle forward by a distance d', otherwise sending a warning to the driver of the present vehicle. Here, the present vehicle may be moved forward by using a forward drive control (FDC) module of the vehicle. In addition, the warning may be made through a human-machine interface (HMI) of the vehicle. When the present vehicle faces an immediate risk of being rear-ended, such an anti-collision operation can enable the present vehicle to automatically move forward by a distance where a condition for moving forward is satisfied (for example, where there is a safe distance ahead of the present vehicle to move forward, the brake of the present vehicle is not stepped on, etc.), such that at least the severity of a rear-end collision that the vehicle may undergo is reduced, or even a rear-end collision is avoided. Such an anti-collision operation can also enable the warning to be given to the driver through the HMI, for example, by using a sound alert, a light alert, a text display alert, an image display alert, or other methods, where the condition for moving forward is not satisfied.

The forward safe distance d is a distance within which the present vehicle is able to move forward safely. The forward safe distance d may be determined based on information associated with statuses of the present vehicle and an obstacle ahead. For example, $d=d_1-d_2$, where $d_1$ is an actually measured distance between the present vehicle and the forward obstacle, and $d_2$ is a pre-determined minimum safe distance between the present vehicle and the forward obstacle. In addition, d'≤d, such that a distance by which the present vehicle moves froward is not beyond a safe range.

The method for vehicle anti-collision control according to an embodiment of the disclosure further includes: when the brake is not stepped on and d>0, moving the present vehicle forward by the distance d', and also sending a warning to the driver, such that the driver is prepared to protect himself/herself or participates in handling of a risk of a rear-end collision manually.

The method for vehicle anti-collision control according to an embodiment of the disclosure further includes: sending a warning to the driver if $T_{threshold} \leq T < T'_{threshold}$. $T'_{threshold}$ is another pre-determined anti-collision time threshold, and $T'_{threshold} > T_{threshold}$. Appropriate $T'_{threshold}$ may be selected, such that within a time range satisfying $T_{threshold} \leq T < T'_{threshold}$, the driver has enough time to manually deal with such a risk although the present vehicle faces a risk of being rear-ended. For example, $T'_{threshold}$ may be 3 s, 4 s, 4.5 s, etc. In this case, the warning sent to the driver may be a different warning, such as a different sound, light, or displayed content, from a warning that is sent where $T < T_{threshold}$. Such a hierarchical warning system may allow different alerts to be sent to the driver when facing risks of rear-end collisions of different degrees in emergency, thereby facilitating the driver in taking more appropriate measures to deal with them.

The method for vehicle anti-collision control according to an embodiment of the disclosure further includes: before the present vehicle is moved forward by a distance, setting an auto-hold function to a deactivated state, setting a gear of the vehicle to a forward gear, setting an auto-parking brake to a released state, or any combination of the settings above. Such an operation facilitates the present vehicle in automatically moving forward by a distance in subsequent operations.

The method for vehicle anti-collision control according to an embodiment of the disclosure further includes: after the present vehicle is moved forward by a distance, activating the auto-hold function of the present vehicle, and braking the present vehicle through the auto-hold function, thereby ensuring the safety of the present vehicle after automatically moving forward by the distance.

The method for vehicle anti-collision control according to an embodiment of the disclosure includes: if it is detected that the vehicle behind sends information that the vehicle behind is to perform lane changing, skipping performing the anti-collision operation.

Rear-end accidents often happen on the street of urban areas. When a vehicle stops while waiting on the street of urban areas, the vehicle may have a risk of being rear-ended, but a driver may have no knowledge of the risk, or the driver may already not have enough time to calmly deal with such a risk. In most cases, provided that a distance between the present vehicle and a vehicle behind can be increased, a rear-end accident may be avoided or greatly mitigated. Moving the vehicle forward by a distance by using the method 1000 for vehicle anti-collision control may avoid the risk of being rear-ended as described above, or may at least mitigate the severity of a rear-end accident. However, it can be understood by those skilled in the art that the disclosure is not limited to the above scenarios, such as on the street of urban areas or when the vehicle stops while waiting, and any suitable scenario of driving conditions may be possible.

Figure 2:
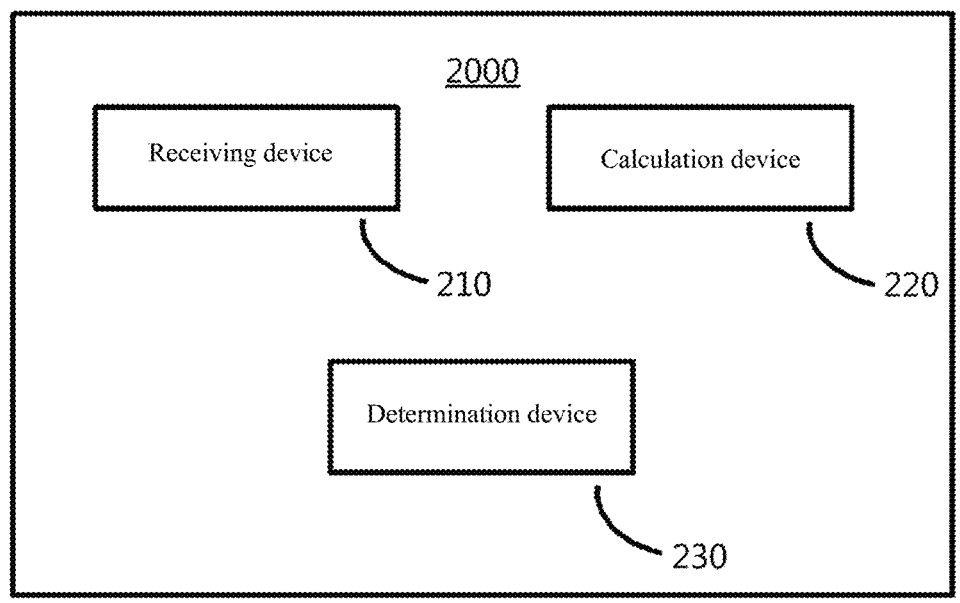
FIG. 2 is a block diagram of an apparatus 2000 for vehicle anti-collision control according to an embodiment of the disclosure.

FIG. 2 is a block diagram of an apparatus 2000 for vehicle anti-collision control according to an embodiment of the disclosure. As shown in FIG. 2, the apparatus 2000 for vehicle anti-collision control includes a receiving device 210, a calculation device 220, and a determination device 230.

The receiving device 210 is configured to receive information about a rear vehicle status (for example, indicating that there is a vehicle coming from behind, there is no vehicle coming from behind, etc.) and a relative distance between a vehicle behind and a present vehicle. Optionally, the receiving device is further configured to receive information associated with statuses of the vehicle and the vehicle behind. Optionally, the receiving device is further configured to receive information associated with statuses of the vehicle and an obstacle ahead. It can be understood that the information received by the receiving device 210 may be information from a vehicle-mounted sensor (for example, a rear-view sensor, a front-view sensor, etc.), may be integrated information based on these vehicle-mounted sensors, may be information from a cloud server, or may be any combination of any of the above information.

The calculation device 220 is configured to: when the information about the status that is received by the receiving device 210 indicates that there is a vehicle coming from behind and the relative distance between the vehicle behind and the present vehicle is less than a pre-determined distance, calculate an estimated time T for which the present vehicle is to be rear-ended by the vehicle behind. The estimated time T may be calculated based on the information that is received by the receiving device 210 and that is associated with the vehicle and the vehicle behind, for example, a relative vehicle speed between the vehicle behind and the present vehicle and, a relative acceleration between the vehicle behind and the present vehicle, the relative distance between the vehicle behind and the vehicle, etc.

The determination device 230 is configured to compare the estimated time T with an anti-collision time threshold $T_{threshold}$, and output an anti-collision control signal if $T<T_{threshold}$. Here, the anti-collision time threshold $T_{threshold}$ is pre-determined. $T_{threshold}$ may be pre-determined based on an average reaction time for a driver to deal with a risk of being rear-ended, such as 1.0 s, 1.2 s, or 1.4 s. Where the estimated time for a rear-end collision is less than the threshold, if only a warning is sent, the driver may not have enough time to calmly deal with such a risk, and therefore, an appropriate automatic anti-collision technique for the vehicle is needed.

In addition, the determination device 230 may be further configured to determine the anti-collision control signal based on a status of a brake of the present vehicle and a forward safe distance d: when the brake is not stepped on and d>0, the anti-collision control signal enabling the present vehicle to move forward by a distance d', otherwise the anti-collision control signal enabling the present vehicle to send a warning to a driver. Optionally, the anti-collision control signal may be output to an FDC of the present vehicle, such that the present vehicle is moved forward by the distance d' through the FDC. Optionally, the anti-collision control signal may also be output to an HMI of the present vehicle, such that the warning is sent to the driver through the HMI. When the present vehicle faces an immediate risk of being rear-ended, such an anti-collision control signal can enable the present vehicle to automatically move forward by a distance where a condition for moving forward is satisfied, such that at least the severity of a rear-end collision that the present vehicle may undergo is reduced, or even a rear-end collision is avoided. Such an anti-collision control signal may also enable the present vehicle to give a warning to the driver where the condition for moving forward is not satisfied.

The forward safe distance d is a distance within which the present vehicle is able to move forward safely. The forward safe distance d may be determined based on the information that is received by the receiving device 210 and that is associated with the statuses of the present vehicle and the obstacle ahead. For example, $d=d_1-d_2$, where $d_1$ is an actually measured distance between the present vehicle and the forward obstacle, and $d_2$ is a pre-determined minimum safe distance between the present vehicle and the forward obstacle. In addition, d'≤d, such that a distance by which the present vehicle moves froward is not beyond a safe range.

In the apparatus for vehicle anti-collision control according to an embodiment of the disclosure, when the brake is not stepped on and d>0, not only the present vehicle is moved forward by the distance d', and a warning is also sent to the driver through the HMI, such that the driver is prepared to protect himself/herself or participates in handling of a danger of a rear-end collision manually.

In the apparatus for vehicle anti-collision control according to an embodiment of the disclosure, the determination device may be further configured to: send a signal to enable the present vehicle to send a warning to the driver through the HMI if $T_{threshold} \leq T < T'_{threshold}$. $T'_{threshold}$ is another pre-determined anti-collision time threshold, and $T'_{threshold} > T_{threshold}$. Appropriate $T_{threshold}$ and $T'_{threshold}$ may be selected, such that within a range satisfying $T_{threshold} \leq T < T'_{threshold}$, the driver may have enough time to manually deal with such a risk although the present vehicle faces a risk of being rear-ended. For example, $T_{threshold}$ may be 1.0 s, 1.2 s, 1.4 s, etc., and $T'_{threshold}$ may be 3 s, 4 s, 4.5 s, etc. In this case, the warning sent to the driver may be a different warning, such as a different sound, light, or displayed content, from a warning that is sent where $T<T_{threshold}$. Such a hierarchical warning system may allow different alerts to be sent to the driver when facing risks of rear-end collisions of different degrees in emergency, thereby facilitating the driver in taking appropriate measures to deal with them.

In the apparatus for vehicle anti-collision control according to an embodiment of the disclosure, before the present vehicle is moved forward, the anti-collision control signal enables the vehicle to set an auto-hold function to a deactivated state, set a gear of the vehicle to a forward gear, set an auto-parking brake to a released state, or any combination of the settings above. Such an operation facilitates the present vehicle in automatically moving forward by a distance in subsequent operations.

In the apparatus for vehicle anti-collision control according to an embodiment of the disclosure, after the present vehicle is moved forward by a distance, the anti-collision control signal enables the auto-hold function of the present vehicle to be activated, and enables the present vehicle to be braked through the auto-hold function, thereby ensuring the safety of the present vehicle after automatically moving forward by the distance.

In the apparatus for vehicle anti-collision control according to an embodiment of the disclosure, the receiving device 210 is further configured to receive information about a lane change status of the vehicle behind. The determination device 230 is further configured to skip performing the anti-collision operation if the information about the lane change status that is received by the receiving device 210 indicates that the vehicle behind is to perform lane changing.

The apparatus for vehicle anti-collision control according to an embodiment of the disclosure is included in advanced driver assistance systems (ADAS) of the present vehicle.

Some block diagrams shown in FIG. 2 are functional entities and do not necessarily correspond to physically or logically independent entities. These functional entities may be implemented in the form of software, in one or more hardware modules or integrated circuits, or in different networks and/or processor apparatuses and/or micro-controller apparatuses.

It should be understood that the method for vehicle anti-collision control according to the preceding embodiments of the disclosure can be implemented as a computer program product. Therefore, the disclosure may, for example, take the form of a computer program product implemented on one or more computer-available storage media (including but not limited to a magnetic disk memory, an optical memory, etc.) containing computer-available program code therein.

It should be further understood that the apparatus for vehicle anti-collision control according to the preceding embodiments of the disclosure can be incorporated into a vehicle.

In summary, when a vehicle faces an immediate risk of being rear-ended, the vehicle anti-collision control technique provided in the disclosure enables the vehicle to automatically move forward by a distance where a condition for moving forward is satisfied (for example, where there is still a safe distance ahead to move forward, a brake of the vehicle is not stepped on, etc.), such that at least the severity of a rear-end collision that the vehicle may undergo is reduced, or even a rear-end collision is avoided.

Although only some implementations of the invention are described above, those of ordinary skill in the art should understand that the invention may be implemented in a plurality of other forms without departing from the essence and scope of the invention. Accordingly, the presented examples and implementations are considered to be illustrative rather than restrictive, and the invention may encompass various modifications and replacements without departing from the spirit and scope of the invention that are defined by the appended claims.

The invention claimed is:

1. A method for vehicle anti-collision control, comprising:
    receiving information about a rear vehicle status and a relative distance between a vehicle behind and a present vehicle;
    when the information about the status indicates that there is a vehicle coming from behind and the relative distance between the vehicle behind and the present vehicle is less than a pre-determined distance, calculating an estimated time T for which the present vehicle is to be rear-ended by the vehicle behind; and
    performing an anti-collision operation for the present vehicle if $T<T_{threshold}$, where $T_{threshold}$ is a pre-determined first anti-collision time threshold, wherein the anti-collision operation is determined based on a status of a brake of the present vehicle and a forward safe distance d:
    when the brake is not stepped on and d>0, moving the present vehicle forward by a distance d', otherwise sending a first rear-end collision warning to a driver,
    wherein the forward safe distance d is a distance within which the present vehicle is able to move forward safely, and d'≤d.

2. The method for vehicle anti-collision control according to claim 1, further comprising:
    if it is detected that the vehicle behind sends information that the vehicle behind is to perform lane changing, skipping performing the anti-collision operation.

3. The method for vehicle anti-collision control according to claim 1, wherein
    the estimated time T is calculated at least based on the relative distance between the vehicle behind and the present vehicle, and a relative vehicle speed between the vehicle behind and the present vehicle and/or a relative acceleration between the vehicle behind and the present vehicle.

4. The method for vehicle anti-collision control according to claim 3, wherein
    the information about the rear vehicle status, the information that the vehicle behind is to perform lane changing, the relative distance between the vehicle behind and the present vehicle, and the relative vehicle speed between the vehicle behind and the present vehicle and/or the relative acceleration between the vehicle behind and the present vehicle are integrated information from a rear-view sensor of the present vehicle and/or information from a cloud server.

5. The method for vehicle anti-collision control according to claim 1, wherein
    the forward safe distance $d=d_1-d_2$,
    $d_1$ is an actually measured distance between the present vehicle and the forward obstacle,
    $d_2$ is a pre-determined minimum distance between the present vehicle and the forward obstacle, and
    $d_1$ and $d_2$ comprise integrated information from a front-view sensor of the present vehicle and/or information from a cloud server.

6. The method for vehicle anti-collision control according to claim 1, wherein
    when the brake is not stepped on and d>0, the first rear-end collision warning is also sent to the driver.

7. The method for vehicle anti-collision control according to claim 1, further comprising:
    sending a second rear-end collision warning to the driver if $T_{threshold} \leq T < T'_{threshold}$,
    where $T'_{threshold}$ is a pre-determined second anti-collision time threshold, and $T'_{threshold} > T_{threshold}$.

8. The method for vehicle anti-collision control according to claim 1, wherein
    before the present vehicle is moved forward, the following operations are performed for the present vehicle:
    setting an auto-hold function to a deactivated state,
    setting a gear to a forward gear, and/or
    setting an auto-parking brake to a released state; and/or
    after the present vehicle is moved forward, the auto-hold function is activated, and the present vehicle is braked through the auto-hold function.

9. A computer device, comprising a processor and a memory, wherein
    when a computer program stored on the memory is run on the processor, a method for vehicle anti-collision control is implemented, the method comprising:
    receiving information about a rear vehicle status and a relative distance between a vehicle behind and a present vehicle;
    when the information about the status indicates that there is a vehicle coming from behind and the relative distance between the vehicle behind and the present vehicle is less than a pre-determined distance, calculating an estimated time T for which the present vehicle is to be rear-ended by the vehicle behind; and
    performing an anti-collision operation for the present vehicle if $T<T_{threshold}$, where $T_{threshold}$ is a pre-determined first anti-collision time threshold, wherein the anti-collision operation is determined based on a status of a brake of the present vehicle and a forward safe distance d:
    when the brake is not stepped on and d>0, moving the present vehicle forward by a distance d', otherwise sending a first rear-end collision warning to a driver,
    wherein the forward safe distance d is a distance within which the present vehicle is able to move forward safely, and d'≤d.

10. An apparatus for vehicle anti-collision control, comprising:
    a receiving device configured to receive information about a rear vehicle status and a relative distance between a vehicle behind and a present vehicle;
    a calculation device configured to: when the information about the status indicates that there is a vehicle coming from behind and the relative distance between the vehicle behind and the present vehicle is less than a pre-determined distance, calculate an estimated time T for which the present vehicle is to be rear-ended by the vehicle behind; and
    a determination device configured to output an anti-collision control signal if $T<T_{threshold}$, where $T_{threshold}$ is a pre-determined first anti-collision time threshold,
    the determination device is further configured to determine the anti-collision control signal based on a status of a brake of the present vehicle and a forward safe distance d:
    when the brake is not stepped on and d>0, the anti-collision control signal enabling the present vehicle to move forward by a distance d', otherwise the anti-collision control signal enabling the present vehicle to send a first rear-end collision warning to a driver, wherein the forward safe distance d is a distance within which the present vehicle is able to move forward safely, and d'≤d.

11. The apparatus for vehicle anti-collision control according to claim 10, wherein
- the receiving device is further configured to receive information about a lane change status of the vehicle behind; and
- the determination device is further configured to skip performing the anti-collision operation if the information about the lane change status indicates that the vehicle behind is to perform lane changing.

12. The apparatus for vehicle anti-collision control according to claim 10, wherein
- the receiving device is further configured to receive a relative vehicle speed between the vehicle behind and the present vehicle and/or a relative acceleration between the vehicle behind and the present vehicle, and
- the calculation device is further configured to calculate the estimated time T at least based on the relative distance between the vehicle behind and the present vehicle, and the relative vehicle speed between the vehicle behind and the present vehicle and/or the relative acceleration between the vehicle behind and the present vehicle.

13. The apparatus for vehicle anti-collision control according to claim 10, wherein
- the receiving device is further configured to receive an actually measured distance $d_1$ between the present vehicle and the forward obstacle and a pre-determined minimum distance $d_2$ between the present vehicle and the forward obstacle,
- the forward safe distance $d=d_1-d_2$, and
- $d_1$ and $d_2$ comprise integrated information from a front-view sensor of the present vehicle and/or information from a cloud server.

\* \* \* \* \*